United States Patent Office 2,895,920
Patented July 21, 1959

2,895,920

PROCESS FOR CATALYST PREPARATION

Edward J. Janoski, Philadelphia, Pa., assignor to Sun Oil Company, Philadelphia, Pa., a corporation of New Jersey No Drawing. Application November 29, 1955
Serial No. 549,838

8 Claims. (Cl. 252—452)

This invention relates to a process for the preparation of catalytic compositions effective for hydrocarbon conversions.

The conversion of hydrocarbons, such as by hydrogenation, dehydrogenation, isomerization, polymerization, cracking, hydrorefining, hydrocracking, and the like are well established and various catalytic compositions have been described as useful in such processes. Such catalysts, however, especially those described as suitable for use in hydrorefining and hydrocracking, have not proved satisfactory. Heretofore proposed catalysts suffer from one or more of the following difficulties: rapid catalyst deactivation, high production of dry gas, coke and other undesired products, low yields of desired products, insufficient removal of non-hydrocarbons from hydrocarbons, e.g. by converting organic sulfur compounds to hydrogen sulfide, and being difficult to regenerate.

An object of the present invention is to provide a process for the preparation of catalytic compositions which are effective in the above mentioned hydrocarbon conversion processes and which are especially effective for hydrorefining and hydrocracking. By "hydrorefining," as used herein, is meant the contacting of hydrocarbons admixed with non-hydrocarbons and hydrogen with a catalyst under reaction conditions to convert non-hydrocarbons to hydrocarbons and innocuous materials which are readily removable from the hydrocarbons. For example, a principal reaction in hydrorefining is the conversion of sulfur contained in organic sulfur compounds to hydrogen sulfide. Another reaction which occurs is the conversion of nitrogen contained in nitrogen compounds to ammonia. Hydrorefining is especially useful for petroleum distillate fractions, e.g. gasoline, kerosene, and gas oils. By "hydrocracking," as used herein, is meant the simultaneous hydrorefining and cracking of the hydrocarbons of the charge stock to lower molecular weight hydrocarbons. Hydrocracking is especially useful when operating with relatively high boiling petroleum fractions such as petroleum residues. For convenience, the term "hydrocracking," as used herein, is intended to include hydrorefining, as above defined, unless otherwise stated. Other objects in their achievement in accordance with the process of the invention will be apparent from the following specification.

A new method for the preparation of catalytic compositions comprising a difficultly reducible oxide and a metal oxide in which the metal is capable of existing in at least two valence states has been discovered. According to the process, there is prepared a composite comprising the hydrogel of a difficultly reducible metal oxide and a compound of a metal convertible to the metal oxide in which the metal is capable of existing in at least two valence states; for convenience, such compounds of metals are hereinafter designated simply as "metal oxides." This composite is aged in the presence of hydrogen peroxide, which is admixed with the composite as hereinafter described. This aging is essential to the successful preparation of catalytic compositions in accordance with the invention. After aging, the composition is preferably contacted with a solvent such as methanol. The composition is then filtered, dried, and calcined.

The difficultly reducible metal oxides which exist in hydrogel form and which can be employed in the present process are alumina, magnesia, zirconia, silica, and combinations thereof. The formation and properties of such hydrogels are well known, and heretofore described techniques can be used. By "hydrogel," as used herein, is meant the gelatinous solid produced by precipitation of a metal hydroxide, or a mixture of metal hydroxides, and which contains water in the gelatinous solid. Alumina hydrogel, for example, can be prepared by adding ammonium hydroxide to a solution of a water soluble salt of aluminum, such as a solution of aluminum nitrate. Silica hydrogel can be made by stirring a sodium silicate solution, such as a 25° Bé. solution thereof, into a sulfuric acid solution such as a 23° Bé. solution thereof, and washing to remove soluble salts.

Metal oxides which can be employed are generally the oxides of the polyvalent metals of groups IV through VIII of the periodic table. Such metal oxides are a component of the final catalyst, and it is understood that the metal is introduced into composition by way of a compound thereof which is converted to the oxide by calcining, as above described. Oxides of cobalt, iron, nickel, molybdenum, manganese, chromium, vanadium, tin, and tungsten give good results. The metal oxide or mixtures of such oxides should be present in the final catalyst in a quantity of from about 0.1 to 35% by weight. Other compounds of these metals can be present as components of the final catalyst with good results, such as the molybdates, tungstates and vanadates thereof, and such compounds are conveniently considered herein as combinations of the appropriate metal oxides. Minor quantities, say from about 0.1 to about 11% by weight of other metal oxides, such as zinc oxide, cadmium oxide, calcium oxide or magnesium oxide, combinations thereof, and the like, can be incorporated in the catalyst if desired, and in some reactions serve as promotors to enhance catalytic activity.

It is essential to the process of the invention that the difficultly reducible oxide in the form of a hydrogel be combined with the metal oxide prior to aging with hydrogen peroxide. This combining can be performed by any convenient means, such as by coprecipitation, by impregnating the gel of the difficultly reducible oxide with an aqueous solution of a water soluble salt of the metal whose oxide is desired, or by physically combining gels produced from both components. Coprecipitation is the preferred means of combining the oxides. Hydrogen peroxide can be added to the hydrogen to form a slurry. However, it is preferred to add the peroxide prior to completion of the formation of the hydrogel, since by such operation the peroxide is dispersed through the resulting hydrogel. This is preferably accomplished by admixing hydrogen peroxide with the solution of metal salts prior to adding sufficient ammonium hydroxide to complete the precipitation. For example, the hydrogen peroxide is advantageously added to the solution before the pH thereof is raised above about 4.5. Sufficient ammonium hydroxide is then added to raise the pH of the slurry to at least 7, and preferably 9. The resulting hydrogel admixed with hydrogen peroxide is aged from about 10 minutes to 6 hours. When the peroxide is added prior to substantial formation of the hydrogel, aging for a relatively short time, say for from about 10 minutes to 2 hours gives good results. When the peroxide is added after substantial or complete formation of the hydrogel, aging for a relatively long time, say for from about 2 hours to 6 hours, is advantageous.

A quantity of hydrogen peroxide sufficient to maintain the metals in their highest valence state must be used. Aqueous solutions of from 10% to 90% hydrogen peroxide can be used. A solution of hydrogen peroxide less than about 10% does not give good results in that an excessive quantity of water is added which adversely affects the gel structure. From about 0.2 to 200% by weight of 30% hydrogen peroxide, based on the amount of cobalt and molybdenum present, calculated as cobalt molybdate, gives good results, or an equivalent quantity of a hydrogen peroxide solution of a strength within the above defined limits likewise gives good results. The reason why such aging is essential is not known with certainty, but it is believed that the metals of the metal oxides are thereby maintained in their highest valence state while the structure of the gel is forming, which in some manner results in a catalyst of high activity.

After aging with hydrogen peroxide, a low molecular weight oxygen-containing organic solvent which is miscible with water, preferably methanol or ethanol, is slurried with the composition to displace the aqueous material therefrom. Propanol, methyl ethyl ketone, acetone or acetaldehyde can be substituted for the methanol in some instances with good results. This use of a low molecular weight organic solvent is preferred since a catalytic composition having especially desired properties, is obtained therewith, although the reason for such achievement is not known. It is believed that the use of the solvent, following aging with hydrogen peroxide, causes the gel structure to become fixed so that on subsequent calcination the catalyst forms with an imperfect lattice, thereby producing a catalyst of high activity.

After displacing the aqueous material with methanol the slurry is filtered. If desired or necessary, the composition can be slurried 2 or more times with methanol and filtered. The filtered material is dried, such as by heating to a temperature of from about 180° F. to 250° F. for from 5 to 20 hours. The dry material is advantageously pulverized, made into a dough with a small quantity of water, cast into pellets, and calcined, such as by heating to 900° F. to 1400° F. for from 2 to 10 hours. The catalyst preparation can be otherwise completed so that the final composition has a desired form, such as by calcining the pulverized catalyst for subsequent use in a fluidized process.

After use in a hydrocarbon conversion process for a substantial time, the activity of the catalyst may decrease. Substantially the initial activity of the catalyst may be restored by heating, in contact with an oxygen containing atmosphere such as air, to a temperature of from about 840° F. to 932° F.

The following examples illustrate the preparation of catalytic compositions in accordance with the process of the invention, in which "parts" refers to parts by weight unless otherwise stated.

EXAMPLE 1

2250 parts of aluminum nitrate ($Al(NO_3)_3 \cdot 9H_2O$), 42.8 parts of cobalt nitrate ($Co(NO_3)_2 \cdot 6H_2O$) and 7.3 parts of zinc chloride ($ZnCl_2$, contained in solution of about 20 parts of hydrochloric acid) were dissolved in about 10,000 parts of hot water. To this solution was added, with stirring 563.4 parts of concentrated (25.3° Bé.) ammonium hydroxide containing in solution 40.6 parts of ammonium molybdate (($NH_4)_6Mo_7O_{24} \cdot 4H_2O$). About 350 parts of concentrated (30%) hydrogen peroxide was added with stirring. With continued stirring, about 720 parts of concentrated ammonium hydroxide was added to increase the pH of the solution to 9 and substantially complete the formation of the hydrogel.

The hydrogel-hydrogen peroxide composite was allowed to stand 1 hour and was then filtered. The separated hydrogel was slurried, by rapid mechanical agitation, with about 3200 parts of absolute methanol. The hydrogel was set by the contacting with methanol. After filtering, the precipitate was reslurried with a like quantity of absolute methanol and filtered. The filtered material was slurried with about 3200 parts water to remove any remaining water soluble salts, and filtered. The separated precipitate was dried by heating at 230° F. for 16 hours. The dried material was pulverized, mixed with water to form a dough and cast into pellets, which were dried for 16 hours at 400° F. and then calcined by heating to 1000° F. over a period of from 4 to 6 hours. The resulting composition contained 3.1% CoO, 9.4% $MoO_3$, 1.3% ZnO and 86.2% $Al_2O_3$.

This catalyst, designated "Catalyst A" in the following examples, was used in a process for hydrorefining gas oil as described in co-pending United States patent application Serial Number 549,843, filed November 29, 1955, now abandoned, and for hydro-cracking petroleum residues as also described in said co-pending patent application.

The foregoing procedure was repeated except that the incorporation of zinc oxide was omitted. The final composition contained 3.1% CoO, 9.5% $MoO_3$ and 87.4% $Al_2O_3$; this catalyst illustrates a preparation in accordance with the invention and is designated "Catalyst B" in the following examples.

The foregoing procedure was repeated except that cadmium oxide was substituted for zinc oxide by using cadmium nitrate tetrahydrate instead of zinc chloride. The catalyst consisted of 3.1% CoO, 9.4% $MoO_3$, 1.3% CdO and 86.2% $Al_2O_3$; this catalyst illustrates a preparation in accordance with the invention and is designated "Catalyst C" in the following examples.

A commercially available catalyst consisting of about 13% cobalt molybdate on alumina is hereinafter designated as "Catalyst D."

A gas oil having a boiling range of from about 678° F. to 920° F. and a relatively high content of organic sulfur compounds was hydrorefined in accordance with the process of the invention. A stream of the charge stock and hydrogen in a mole ratio of hydrogen to hydrocarbons of 20 was passed downwardly on a bed of the indicated catalyst at a space rate of 1 v./v./hour, a temperature of 775° F. and a pressure of 1500 p.s.i.g. The following results, compared to the charge stock, were obtained:

Table I

|  | Charge Stock | Catalyst A | Catalyst B | Catalyst C | Catalyst D |
|---|---|---|---|---|---|
| A.P.I. gravity (60° F.) | 22.4 | 30 | 30 | 29.6 | 30 |
| Viscosity (SUS at 210° F.) | 43 | 36 | 36 | | |
| Sulfur content (Wt. percent as sulfur) | 2.2 | 0.05 | 0.15 | 0.05 | 0.50 |
| Nitrogen content (Wt. percent as nitrogen) | 0.09 | 0.008 | 0.02 | 0.026 | 0.036 |
| H/C atomic ratio | 1.69 | 1.80 | 1.73 | 1.79 | 1.71 |

These data show catalysts A, B, and C, prepared in accordance with the process of the invention, to be remarkably superior to a comparable catalyst (catalyst D) prepared by means heretofore known. It will be observed that minor quantities of zinc oxide and cadmium oxide increased the catalyst activity, but that, with identical components, the catalyst (B) gave results remarkably superior to a catalyst (D) prepared by means heretofore known.

A substantial advantage of the catalysts prepared by the process of the invention is that, to remove non-hydrocarbons to reach a given concentration thereof in a petroleum fraction, a relatively rapid space velocity can be used thereby decreasing the time required and/or the size of the apparatus involved.

The catalysts of the invention can be used in other processes, such as cracking, dehydrogenation, destructive dehydrogenation, and the like.

The invention claimed is:

1. Process for the preparation of a catalyst which comprises preparing a solution of a water soluble compound of a metal selected from the group consisting of aluminum, magnesium, zirconium, and silicon and a water soluble compound of a metal selected from the group consisting of cobalt, iron, nickel, molybdenum, manganese, chromium, vanadium, tin, tungsten, and mixtures thereof, in quantities so that the final catalyst has the hereinafter recited composition, admixing said solution with a quantity of hydrogen peroxide sufficient to maintain the metals in their highest valence state, introducing ammonium hydroxide into said mixture to produce a hydrogel, aging said hydrogel for from 10 minutes to 6 hours, admixing the aged hydrogel with a low molecular weight oxygen-containing organic solvent which is miscible with water, separating said organic solvent, admixing the separated aged gel with water, separating said water from the gel, drying the separated gel for from 5 to 20 hours at a temperature of from about 180° F. to 250° F. and calcining the dried composition for from about 2 to 10 hours at a temperature of from about 900° F. to 1400° F. to produce a catalyst consisting essentially of an oxide of said metal selected from the group consisting of aluminum, magnesium, zirconium and silicon and from 0.1% to 35% by weight of the oxide of the metal of said selected water soluble compound.

2. Process according to claim 1 wherein the hydrogen peroxide is added to the solution at a pH of not greater than 4.5 and wherein ammonium hydroxide is subsequently added to raise the pH to at least 7.

3. Process for the preparation of a catalyst which comprises preparing a solution of a water soluble compound of aluminum and at least one water soluble compound of a polyvalent metal selected from the group consisting of cobalt, iron, nickel, molybdenum, manganese, chromium, vanadium, tin and tungsten in quantities so that the final catalyst has the hereinafter recited composition, introducing a quantity of hydrogen peroxide sufficient to maintain the metals in their highest val[ence] state into the solution at a pH of not greater than [4.5,] introducing ammonium hydroxide into the solution to [in]crease the pH thereof to at least 7 to form a hydro[gel,] aging the so-formed hydrogel for from 10 minutes t[o 6] hours, admixing the aged hydrogel with a water misc[ible] oxygen-containing organic solvent to form a slurry, se[pa]rating the gel from the solvent, and washing, drying [and] calcining the gel to produce a catalyst consisting ess[en]tially of alumina and from 0.1% to 35% by weight [of] the oxide of the metal of said selected water solu[ble] compound.

4. Process according to claim 3 wherein said wat[er] soluble compound of a polyvalent metal is a compou[nd] of molybdenum.

5. Process according to claim 3 wherein said wat[er] soluble compound of a polyvalent metal is a compou[nd] of cobalt.

6. Process according to claim 3 wherein said wat[er] soluble compound of a polyvalent metal is a compoun[d] of chromium.

7. Process according to claim 3 wherein said wate[r] soluble compound of a polyvalent metal is a compound o[f] nickel.

8. Process according to claim 3 wherein the water solu[ble] compound of a polyvalent metal is a mixture of com[-]pounds of molybdenum and cobalt.

References Cited in the file of this patent

UNITED STATES PATENTS

| | | |
|---|---|---|
| 2,419,342 | Edson et al. | Apr. 22, 1947 |
| 2,566,521 | Haensel | Sept. 4, 1951 |
| 2,635,082 | Smith | Apr. 14, 1953 |
| 2,638,455 | Pitzer | May 12, 1953 |
| 2,739,132 | Riedl | Mar. 20, 1956 |
| 2,754,325 | Smith | July 10, 1956 |